(12) United States Patent
Noda

(10) Patent No.: US 11,979,527 B2
(45) Date of Patent: May 7, 2024

(54) DISPLAY DEVICE, IMAGE PROCESSING DEVICE, AND DISPLAY METHOD

(71) Applicant: SHARP KABUSHIKI KAISHA, Sakai (JP)

(72) Inventor: Shoji Noda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/879,522

(22) Filed: Aug. 2, 2022

(65) Prior Publication Data

US 2023/0052805 A1 Feb. 16, 2023

(30) Foreign Application Priority Data

Aug. 10, 2021 (JP) .................... 2021-130611

(51) Int. Cl.
*H04N 1/00* (2006.01)
*G06F 3/12* (2006.01)

(52) U.S. Cl.
CPC ....... *H04N 1/00424* (2013.01); *G06F 3/1205* (2013.01); *G06F 3/1256* (2013.01); *H04N 1/00411* (2013.01); *H04N 1/00472* (2013.01)

(58) Field of Classification Search
CPC .......... H04N 1/00424; H04N 1/00411; H04N 1/00472; G06F 3/1205; G06F 3/1256
See application file for complete search history.

(56) References Cited

U.S. PATENT DOCUMENTS

| 6,515,684 B1 * | 2/2003 | Knodt | H04N 1/00482 715/810 |
| 2010/0115348 A1 * | 5/2010 | Gilluwe | G06F 16/24 715/733 |
| 2016/0219171 A1 * | 7/2016 | Ebitani | H04N 1/00474 |
| 2022/0166891 A1 * | 5/2022 | Ikeda | H04N 1/00411 |

FOREIGN PATENT DOCUMENTS

| JP | 2005-102001 A | 4/2005 |
| JP | 2017-118456 A | 6/2017 |

* cited by examiner

*Primary Examiner* — Iriana Cruz
(74) *Attorney, Agent, or Firm* — ScienBiziP, P.C.

(57) ABSTRACT

A display device includes: a display to display a function display screen based on device functions; and a controller that controls displaying of the function display screen. The function display screen includes a fixed area where displayed content is fixed and a non-fixed area other than the fixed area. The controller determines a display format of the fixed area in accordance with a display format of the non-fixed area.

14 Claims, 16 Drawing Sheets

FIG. 3

DISPLAY ICON CONTROL TABLE

| ICON ID | DISPLAY ICON | DEVICE FUNCTION | CONTENT | FIXED AREA COORDINATES (DISPLAY POSITION 1) (x,y) | NON-FIXED AREA COORDINATES (DISPLAY POSITION 2) (s,t) | FIXED AREA DISPLAY FLAG (y/n) | PRIORITY | DISPLAY FLAG (y/n) |
|---|---|---|---|---|---|---|---|---|
| 0010 | 0010.jpg | IMAGE OUTPUT 1 | RAN OUT OF TONER. | | (t1,s1) | n | 4 | y |
| 0011 | 0011.jpg | IMAGE OUTPUT 1 | REPLENISH A-4 SIZE PAPER. (TYPE: PLAIN PAPER ) | | (t2,s1) | n | 5 | y |
| 0020 | 0020.jpg | IMAGE OUTPUT 2 | OUTPUT FORMAT IS NOT SET. | | | n | | n |
| 0021 | 0021.jpg | IMAGE OUTPUT 2 | SPECIFY OUTPUT DESTINATION. | (a2,b1) | (t3,s1) | n | 6 | y |
| 0022 | 0022.jpg | IMAGE OUTPUT 2 | CHECK TRANSFER ERROR BOX. | | (t4,s1) | y | 2 | y |
| 0030 | 0030.jpg | IMAGE OUTPUT 1 | SET DOCUMENT. | | (t5,s1) | n | 7 | y |
| 0035 | 0035.jpg | IMAGE OUTPUT 2 | SPECIFY INPUT SOURCE. | | | n | | n |
| 0040 | 0040.jpg | COMMUNICATION | NOT CONNECTED TO NETWORK. CHECK CONNECTION OF LAN CABLE. | (a1,b1) | (t6,s1) | y | 1 | y |
| 0050 | 0050.jpg | JOB-RELATED | CHECK ERROR OF IMAGE JOB LOG. | (a3,b1) | (t7,s1) | y | 3 | y |
| 0060 | 0060.jpg | MAINTENANCE | FIRMWARE UPDATE | | (t8,s1) | n | 8 | y |
| ... | | | | | | | | |

FIG. 8

| DISPLAY ICON SETTING: Yes | | DISPLAY ICON SETTING: No | |
|---|---|---|---|
| FIXED AREA ICON | DISPLAY POSITION 1 | FIXED AREA ICON | NOT DISPLAYED |
| NON-FIXED AREA ICON | NOT DISPLAYED | NON-FIXED AREA ICON | NOT DISPLAYED |
| SYSTEM INFORMATION BUTTON | REDUCED SIZE | SYSTEM INFORMATION BUTTON | NORMAL SIZE |

FIG. 11

| DETAILED SCREEN DISPLAY: Yes | | DETAILED SCREEN DISPLAY: No | |
|---|---|---|---|
| FIXED AREA ICON | DISPLAY POSITION 2 | FIXED AREA ICON | DISPLAY POSITION 1 |
| NON-FIXED AREA ICON | DISPLAY POSITION 2 | NON-FIXED AREA ICON | NOT DISPLAYED |
| SYSTEM INFORMATION BUTTON | CLOSE BUTTON | SYSTEM INFORMATION BUTTON | REDUCED SIZE |

DISPLAY DEVICE, IMAGE PROCESSING DEVICE, AND DISPLAY METHOD

BACKGROUND OF THE INVENTION

Field of the Invention

The present disclosure relates to a display device or the like.

DESCRIPTION OF THE BACKGROUND ART

In an image processing device such as a multifunction copier, there have been known technologies to represent information on device functions such as image input/output, communication, job-related information, or maintenance as graphic information that is easily associated by users.

These pieces of graphic information are referred to as icons and can be displayed and used on, for example, a touch panel serving as a display, device that displays information to a user and an operating device that accepts an operation input from the user. The user can perform a variety of processing by referring to the icons arranged on the touch panel and actually performing tapping operations.

A display area that the display device such as a touch panel can provide has limitations. In order to solve the limited display area, for example, there is a known technique to hide the icons with low priority when all of the icons cannot be arranged in the predetermined area, There is also a known technique to change the display size of the icon in accordance with the frequency of use.

However, in the prior art, all information about the relevant device functions cannot be referred to. In order to refer to all information about the device functions, the following methods may be provided, for example, in which (1) a screen on which all information can referred to (hereinafter, such a screen will be referred to as a detailed screen) is separately displayed and (2) in addition to the configuration of the detailed screen, an input button (a transition button) that allows for a transition to the detailed screen is prepared.

In this case, when the icon that images the detailed screen and the transition button for moving to the detailed screen are displayed while the detailed screen is displayed, the representation is redundant, which may confuse users.

The present disclosure is intended to provide a display device or the like that can provide information on optimal device functions by controlling representation on a screen of an icon, an identification tab, a transition button, or the like related to a detailed screen.

SUMMARY OF THE INVENTION

In order to the above problem, a display device according to an aspect of the present disclosure includes: a display to display a function display screen based on device functions; and a controller that controls displaying of the function display screen. The function display screen includes a fixed area where displayed content is fixed and a non-fixed area other than the fixed area. The controller determines a display format of function identification information to be displayed in the fixed area, in accordance with a display format of the non-fixed area.

Further, an image processing device according to an aspect of the present disclosure includes: the above display device; and an image processor that processes an image as a device function.

Furthermore, a display method according to as aspect of the present disclosure includes: displaying a function display screen based on device functions; and controlling displaying of the function display screen. The function display screen includes a fixed area where displayed content is fixed and a non-fixed area other than the fixed area. In the controlling, a display format of function identification information to be displayed in the fixed area is determined in accordance with a display format of the non-fixed area.

According to an aspect of the present disclosure, by controlling, representation on a screen of an icon, an identification tab, a transition button, or the like related to a detailed screen, a display device that can provide information on optimal device functions.

BRIEF DESCRIPTION OF THE DRAWINGS

FIG. 3 is a diagram for illustrating a display icon control table.

FIG. 8 is a diagram for illustrating an operation example according to the first embodiment.

FIG. 11 is a diagram for illustrating an operation example according to the second embodiment.

DESCRIPTION OF THE PREFERRED EMBODIMENTS

Hereinafter, embodiments of the present disclosure will be described with reference to the drawings. In the present disclosure, a multifunction copier that can perform, in a single body, jobs related to copying, faxing, image sending, and the like will be described as an aspect of a display device or an image processing device in which the display device is mounted. Note that the following embodiments are merely examples to describe the present disclosure, and the technical scope of the description described in the claims is not limited to the following description.

1. First Embodiment

A first embodiment of the disclosure is an embodiment in which the display format of icons as function identification information is determined when a home screen is displayed as the display format of a non-fixed area.

1.1 Functional Configuration

Figure 1:
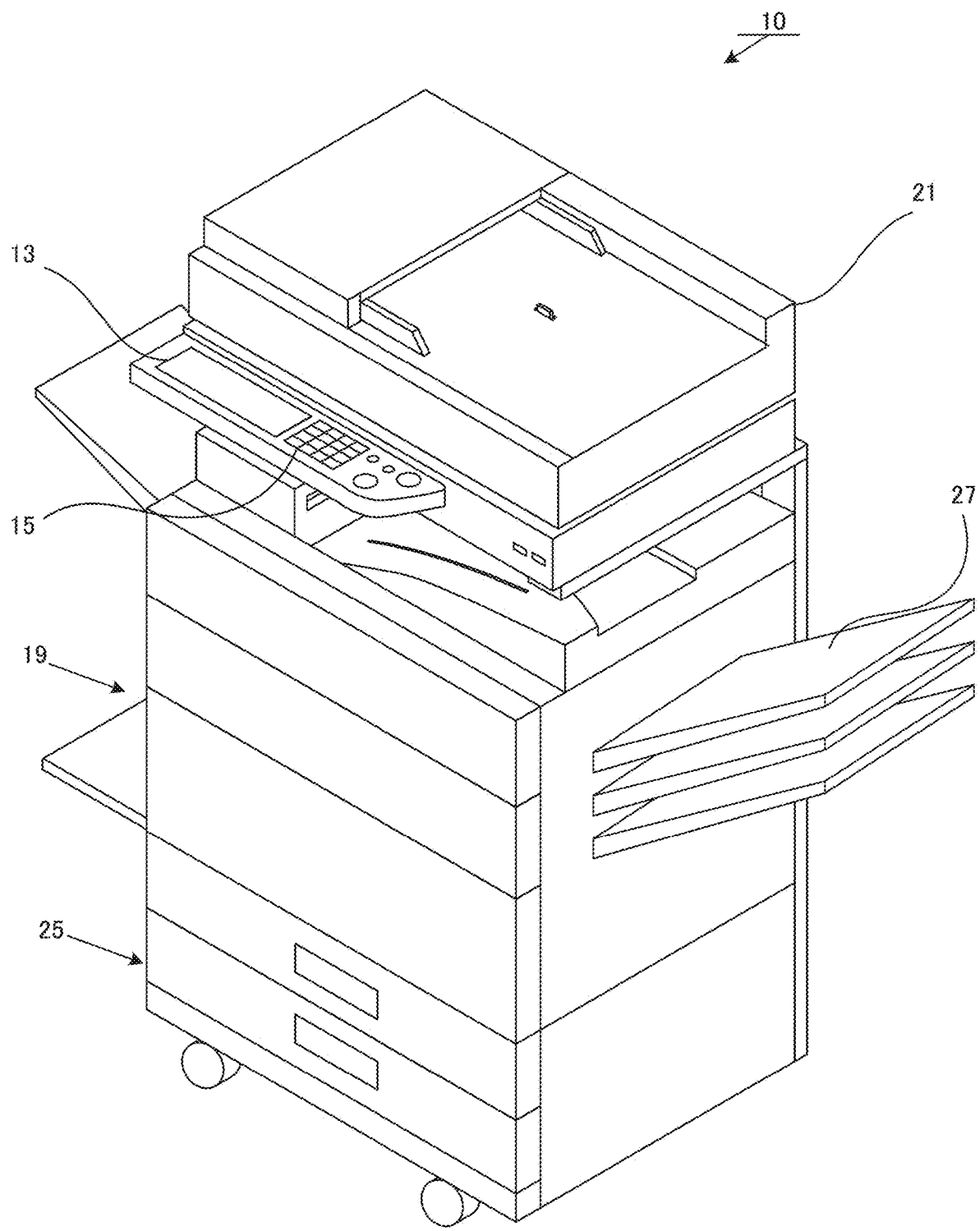
FIG. 1 is an exterior perspective view of a multifunction copier according to a first embodiment of the disclosure.
Figure 2:
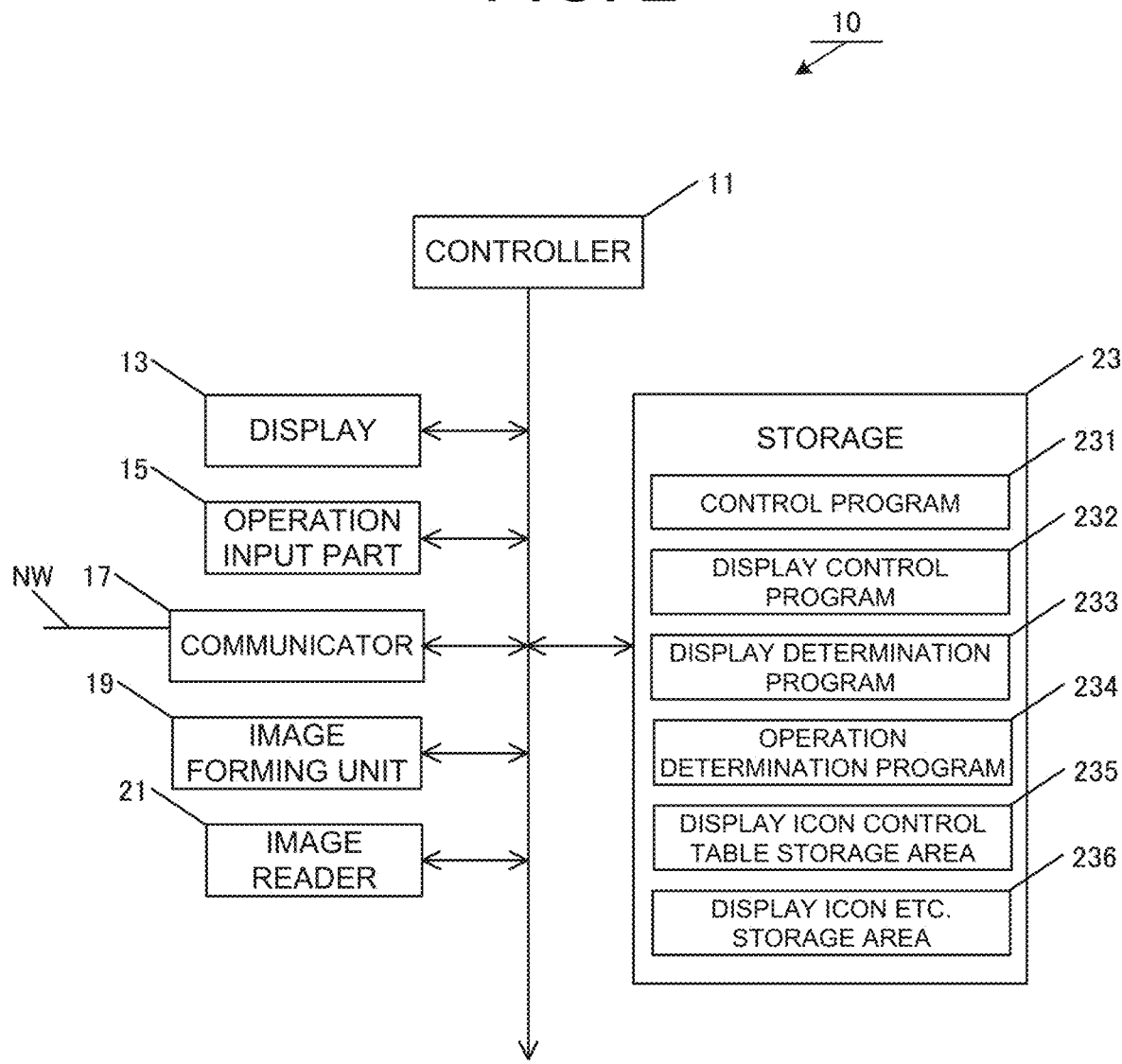
FIG. 2 is a functional configuration diagram of the multifunction copier according to the first embodiment.

A functional configuration of a multifunction copier 10 according to the first embodiment will be described with the use of FIGS. 1 and 2. FIG. 1 is an external perspective view for schematically illustrating the entire configuration of the multifunction copier 10. FIG. 2 is a functional configuration diagram of the multifunction copier 10. The multifunction copier 10 includes a controller 11, a display 13, an operation input part 15, a communicator 17, an image forming unit 19 and an image reader 21 that serve as an image processor, and a storage 23.

The controller 11 controls the entire multifunction copier 10. The controller 11 includes, for example, a single or a plurality of arithmetic devices (central processing unit (CPU) or the like). The controller 11 reads and executes various programs stored in the storage 23, thereby implementing the function.

The display 13 displays a variety of information to a user or the like. The display 13 can include, for example, a liquid crystal display (LCD) display, an electro-luminescence (EL) display, or the like.

The operation input part 15 accepts an input of information from the user or the like. The operation input part 15 can include, for example, hard keys (for example, a numeric keypad), buttons, or the like. Note that the operation input part 15 can be configured as a touch panel that allows an input via the display 13. In this case, for example, a typical method such as a resistive method, an infrared method, an electromagnetic induction method, or a capacitive method can be applied as an input method of the touch panel.

The communicator includes, for example, either one or both of wired and wireless interfaces for communication with other devices via a network (NW) such as a local area network (LAN), a wide area network (WAN), the Internet, a telephone line, or a fax line.

The image forming unit 19 forms an image based on image data on the paper as a recording medium. The image forming unit 19 feeds paper from a paper feeder 25, forms an image based on the image data on the paper, and then discharges the paper to a paper discharger 27. The image forming unit 19 can include, for example, a laser printer or the like that adopts an electrophotographic method. In this case, the image forming unit 19 forms an image with the use of toners supplied from toner cartridges (not illustrated) corresponding to toner colors (for example, cyan, magenta, yellow, black).

The image reader 21 generates the image data by scanning and reading a document image to be read. The image reader 21 can include, for example, a scanner device provided with an image sensor such as a charge coupled device (CCD) or a contact image sensor (CIS). As long as the image reader 21 is configured to generate the image data by reading, with an image sensor, a reflected image from a document image, the configuration thereof is not limited.

The storage 23 stores various programs required for operation of the multifunction copier 10 and a variety of data. The storage 23 may include, for example, a storage device such as a random access memory (RAM), a hard disc drive IIDD, a solid state drive (SSD), or a read only memory (ROM).

In the first embodiment, the storage 23 stores a control program 231, a display control program 232, a display determinationprogram 233, and an operation determination program 234 and secures a display icon control table storage area 235 and a display icon etc. storage area 236.

The control program 231 is a program that is read by the controller 11 in order to perform processing based on each function such as copying, faxing, or image sending. The controller 11 that has read the control program 231 implements each function by controlling the display 13, the operation input part 15, the communicator 17, the image forming unit 19, the image reader 21, or the like.

The display control program. 232 is a program that is read by the controller 11 when the controller 11 controls the display 13 and the operation input part 15. The controller 11 that has read the display control program 232 controls representation on the screen of icons as function identification information related to a detailed screen. In the first embodiment, the icons related to the detailed screen are configured to be displayed in a fixed area where displayed content is fixed and a non-fixed area other than the fixed area in a displayable area on the touch panel (in the present disclosure, a display screen related to the displayable area is referred to as a function display screen). The concrete formats of the fixed area and the non-fixed area will be described below. Note that in the first embodiment, the controller 11 is described as a device that controls input/output of the touch panel, which is one form of the operation input part 15; however, obviously, the display 13 and the operation input part 15 can be configured as separate parts.

The display determination program 233 is a program that is read by the controller 11 when the controller 11 determines a display position of the icon prior to controlling the representation of the icon related to the detailed screen. The controller 11 that has read the display determination program 233 determines, in accordance with the display format in the non-fixed area, the display position and display format of the icon based on a parameter set to each icon.

The operation determination program 234 is a program that is read by the controller 11 when the controller 11 accepts a screen operation by a user. The controller 11 that has read the operation determination program 234 detects a touch, a tapping operation, or the like by the user and determines the operation content.

The display icon control table storage area 235 is a storage area that stores the parameters set to each icon. Here, a configuration example of a display icon control table according to the present disclosure will be described.

FIG. 3 is a diagram for illustrating a data structure example of the display icon control table. The display icon control table includes icon IDs, display icons, device functions, content, fixed area coordinates (display position 1), non-fixed area coordinates (display position 2), fixed area display flags, priority, and display flags as control parameters.

The icon ID is an identifier to uniquely identify each icon. The display icon represents graphic information (file name) of the icon. Note that in addition to the file name, the display icon can include path information to the display icon etc. storage areas 236 in which the file is stored.

The device function represents a device function represented by the icon. The device function may include, but is not limited to, for example, image output 1 (image formation of forming an image based on image data on the paper), image output 2 (output of the image data), image input 1 (image reading by a scanner device or the like), image input 2 (input from an external (storage) device such as a universal serial bus (USB)), communication, a job-related function, maintenance, or the like. In addition, in the first embodiment, the mode to set parameters for icons classified respectively by the device functions will be described.

The content represents concrete content that each icon represents. For example, the icon ID "0010" is an example of the icon that represents the content; "ran out of toner".

The fixed area coordinates (display position 1) represents display coordinates of the icon to be displayed in the fixed area. The displaying of the icon in the fixed area can be set by selecting the icon via the setting screen described below. Additionally, the first embodiment describes that the number of icons that can be displayed in the fixed area is three; however, the number of icons that can be displayed may be changed as appropriate in accordance with the displayable area. When the icon to be displayed in the fixed area is selected, one of (a1, b1), (a2, b1), (a3, b1) is assigned to the display position in accordance with the priority selected as well. FIG. 3 illustrates an example where the icon IDs "0040", "0022", and "0050" are set as the icons to be displayed in the fixed area and (a1, b1) (a2, b1), (a3, b1) are assigned respectively to the display positions of the icons.

The non-fixed area coordinates (display position 2) represent display coordinates of the icon to be displayed in the non-fixed area. In the non-fixed area, all of the icons with the display flags set to "y" can be displayed. FIG. 3 illustrates an example where (t1, s1), (t2, s1), (t3, s1), (t4, s1), (t5, s1), (t6, s1), (t7, s1) and (t8, s1) are assigned respectively to the display positions of the icons of the icon IDs "0010", "0011", "0021", "0022", "0030", "0040", "0050", and "0060" with the display flags set to "y".

The fixed area display flag represents whether the icon can be displayed in the fixed area. In the fixed area, the icon with the parameter of the display flag set to "y" is displayed.

The priority represents display priority of the icon to be displayed in the fixed area. FIG. 3 illustrates an example where priorities "1", "2", and "3" are respectively set to the icons related to the icon IDs "0040", "0022", and "0050". In the fixed area, the icon IDs "0040", "0022", and "0050" are displayed in order of priority. In addition, for example, when the fixed display flag of the icon with the parameter of priority set to "3" is set to "n", the icon with the parameter of priority set to "4" that is the next highest after 3 is displayed in the fixed area.

The display flag represents whether the icon can be displayed. In the non-fixed area, the icon with the parameter of the display flag set to "y" is displayed.

The display icon etc. storage area 236 is a storage area that stores a graphic file of the icons. In addition to the graphic file of the icons, the display icon etc. storage area 236 can also store, for example, a graphic file of an input button (for example, a transition button related to transition of screens) that accepts an operation input by a user, or the like.

1.2 Flow of Processing

Figure 4:
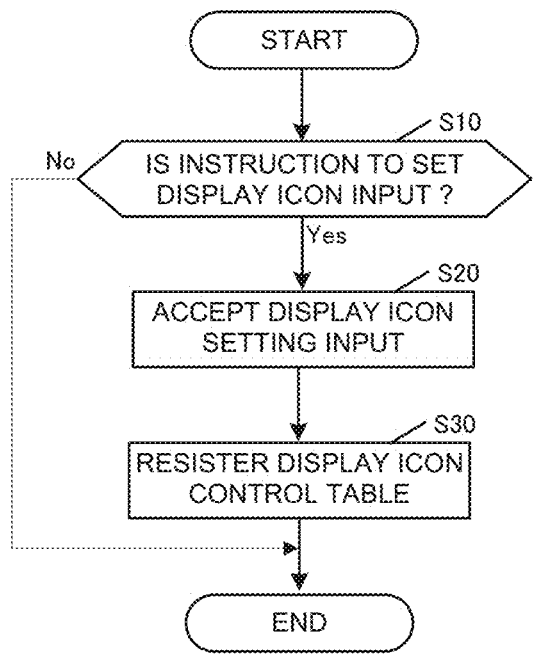
FIG. 4 is a flowchart for illustrating a flow of processing according to the first embodiment.

Next, the flow of processing of the first embodiment will be described. FIG. 4 is a flowchart for illustrating registration processing of parameters to the display icon control table. In addition, the processing is processing that is executed by the controller 11 when the controller 11 reads the control program 231, the operation determination program 234, or the like.

First, the controller 11 determines whether a display icon setting instruction is input by a user (step S10).

When determining that the display icon setting instruction is input by the user, the controller 11 accepts the display icon setting input (step S10; Yes→step S20). On the other hand, when determining that the display icon setting instruction is not input, the controller 11 ends the processing (step S10; No→END).

When accepting the display icon setting input, the controller 11 registers the input value as a parameter in the display icon control table and ends the processing (step S20 step S30).

Next, processing of displaying the icons as function identification information will be described with the use of the flowchart of FIG. 5. The processing is processing executed by the controller 11 when the controller 11 reads the control program 231, the display control program 232, the display determination program 233, the operation determination program 234, or the like.

First, the controller 11 accepts an input of an instruction to display a home screen (step S40). The home screen is a setting accepting screen in which input buttons defined as graphics with figures, letters, numbers, or symbols for the settings related to device functions such as image input/output, communication, job-related functions, or maintenance or for a variety of information are arranged in a consolidated manner. The home screen is displayed in the non-fixed area, for example, when the device is turned on, when the device is restored from a sleep mode, before a logged-in user or the like logs into the device, or when a login authentication is in an off-state.

Next, the controller 11 acquires the parameters in the display icon control table (step S50).

The controller 11 determines whether the parameter of the display icon setting is "Yes". In this case, the controller 11 refers to the parameter of the display flag in the display icon control table (step S60).

When determining that the parameter of the display icon setting is "Yes", the controller 11 determines whether the icon is to be displayed in the fixed area (display position 1) (step S60; Yes step S70). In this case, the controller 11 refers to the fixed area coordinates and the parameter of the fixed area display flag in the display icon control table.

When determining that the icon is to be displayed in the fixed area, the controller 11 displays the icon in the fixed area (step S70; Yes step S80).

Next, the controller 11 determines whether the fixed area is completely filled for displaying (step S90). When determining that the fixed area is completely filled for displaying, the controller 11 displays in a reduced size a system information button that accepts an instruction to display on the detailed screen (step S90; Yes step S100). Then, the controller 11 displays the home screen (step S110) and ends the processing.

On the other hand, when determining that the display icon setting is "No" (step S60; No) or that the icon is not to be displayed in the fixed area (step S70; No), the controller 11 performs processing of not displaying the icon (step S120). Thereafter, the controller 11 displays the system information button in a normal size (step S130) and displays the home screen (step S110), and then ends the processing.

Incidentally, when determining that the fixed area is not completely filled for displaying, the controller 11 determines whether all of the acquired parameters are referred to (step S90; No→step S140). When determining that all of the acquired parameters are referred to, the controller 11 displays the system information button in a reduced size (step S140; Yes→step S100). Then, the controller 11 displays the home screen (step S110) and ends the processing.

On the other hand, when determining that all of the acquired parameters are not referred to, the controller 11 checks the next display icon setting (step S140; No→step S150) and returns the processing to step S60.

1.3 Operation Example

Next, an operation example of the first embodiment will be described. FIG. 6 illustrates a screen configuration example of a function display screen W10 according to the first embodiment. The function display screen W10 displays, in a non-fixed area. R20, the so-called setting accepting screen referred to as the home screen that is displayed when the device is turned on, when the device is restored from a sleep mode, before a logged-in user or the like logs into the device, or when a login authentication is in an off-state. Note that FIG. 6 corresponds processing related to step S60 (No) of FIG. 5, step S120, step S130, and step S110 and illustrates an operation example when the display icon settings are all set to "No".

The function display screen W10 includes a fixed area R10 and the non-fixed area R20. The fixed area R10 is formed at the upper side in the function display screen W10 to be located directly above the non-fixed area R20. The fixed area R10 of the function display screen W10 is provided with a system information button B10 that accepts an input to display the detailed screen. A user can display the detailed screen by pressing the system information button 1310.

The non-fixed area R20 includes a device function etc., selection button area R30 that forms the home screen. The device function etc. selection button area R30 includes the input buttons defined as graphics with figures, letters, numbers, or symbols for the settings related to device functions such as image input/output, communication, job-related functions, or maintenance or for a variety of information. In the example of FIG. 6, the device function etc. selection button area R30 includes a simple copy button, a simple fax button, a simple scan button, a print resource button, a setting history button, a shared folder button, a scan save button, a display icon setting button B20, and the like. The user presses the desired button from the input buttons and thus can perform a function based on the function of the button.

Here, the display icon setting button B20 is an input button that accepts an input of the display icon setting instruction described in the flowchart of FIG. 4. When accepting pressing-down of the display icon setting button B20, the controller 11 displays a display icon setting screen illustrated in the next drawing.

Figure 7:
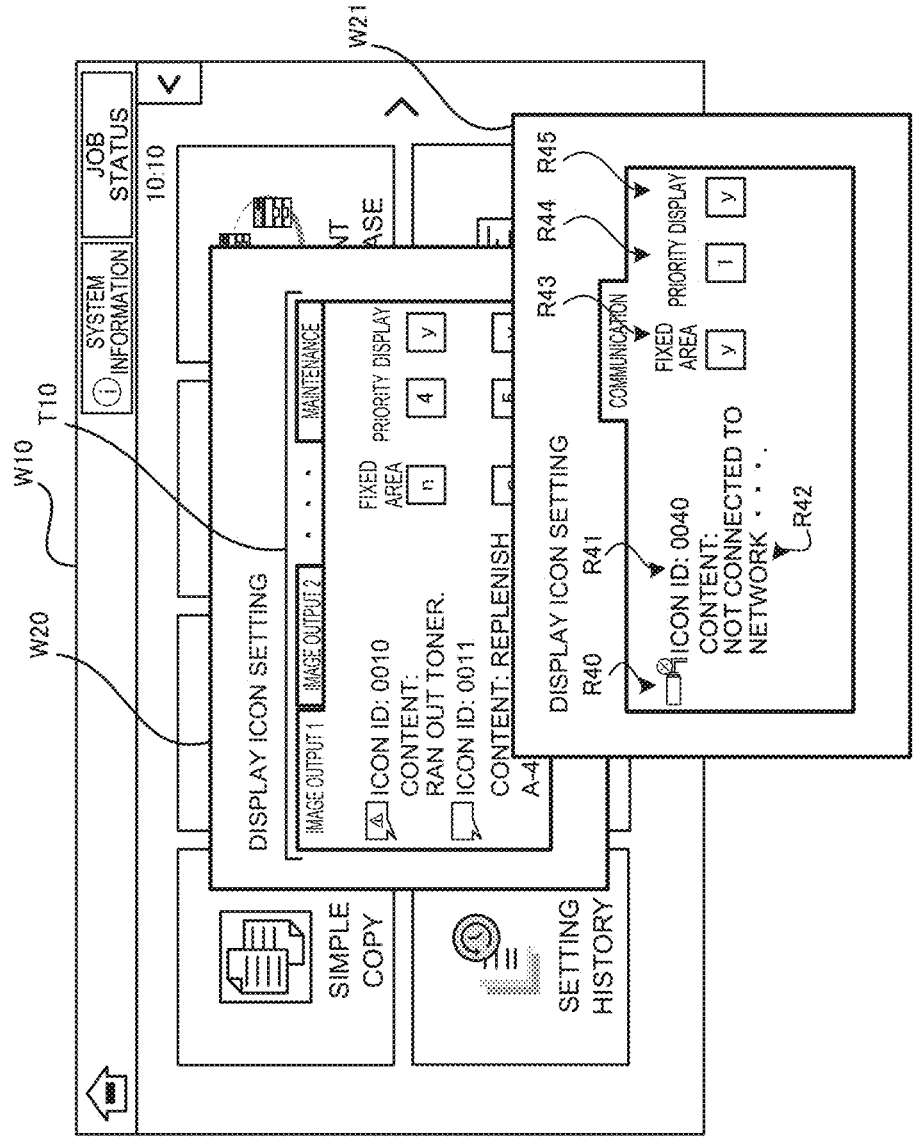
FIG. 7 is a diagram for illustrating an operation example according to the first embodiment.

FIG. 7 illustrates a screen configuration example of a display icon setting screen W20. The display icon setting screen W20 is a setting screen that is superimposed on the function display screen W10 when the display icon setting button B20 in the device function etc. selection button area 1230 is pressed.

The display icon setting screen W20 is provided with a device function selection tab T10 that accepts the setting of the display icon for each device function that is one of the control parameters of the display icon control table illustrated in FIG. 3. For example, when the "Image Output 1" tab on the device function selection tab T10 is selected by the user, the display icon setting screen W20 that accepts the icon setting related to "Image Output 1" is displayed. Here, the display icon setting items will be described with the use of a display icon setting screen W21 related to the "Communication" tab where the display setting for the fixed area R10 is set to "Yes".

The display icon setting screen W21 includes an icon display area R40, an icon ID display area R41, a content display area R42, a fixed area selection area R43, a priority selection area R44, and a display setting selection area 1145.

The icon display area 1140 is an area that displays an icon figure (information). The icon ID display area R41 is an area that displays an icon ID. The content display area. R41 is an area that displays the concrete content represented by the icon. The user can set the display setting for each icon while checking the item displayed in the icon display area R40, the icon ID display area R41, or the content display area R42.

The fixed area selection area R43 includes an input box that accepts the selection of an icon to be displayed in the fixed area. When "y" that indicates displaying in the fixed area R10 is set into the input box, the fixed area display flag in the display icon control table is set to "y". The priority selection area. R44 includes an input box that accepts the selection of display priority of the icon to be displayed in the fixed area R10. When a parameter that indicates priority (in the example of FIG. 7, priority "1") is set into the input box, the priority in the display icon control table is set to the parameter. The display setting selection area R45 includes an input box that accepts the selection of the display setting of the icon. When "y" that indicates displaying in the non-fixed area R20 is set into the input box, the display flag in the display icon control table is set to "y".

FIG. 8 is a diagram that summarizes the display format of icons when the home screen is displayed as the display format of the non-fixed area.

When the display icon setting is "Yes", the icon set to be displayed in the fixed area R10 (fixed area icon) is displayed in the fixed area (display position 1) and is not displayed in the non-fixed area R20. Then, the system information button is displayed in a reduced size by displaying the fixed area icon.

Meanwhile, when the display icon setting is "No", the fixed area icon and the non-fixed area icon are not displayed. The fixed area icon is not displayed; therefore, the system information button is displayed in a normal size.

Figure 9:
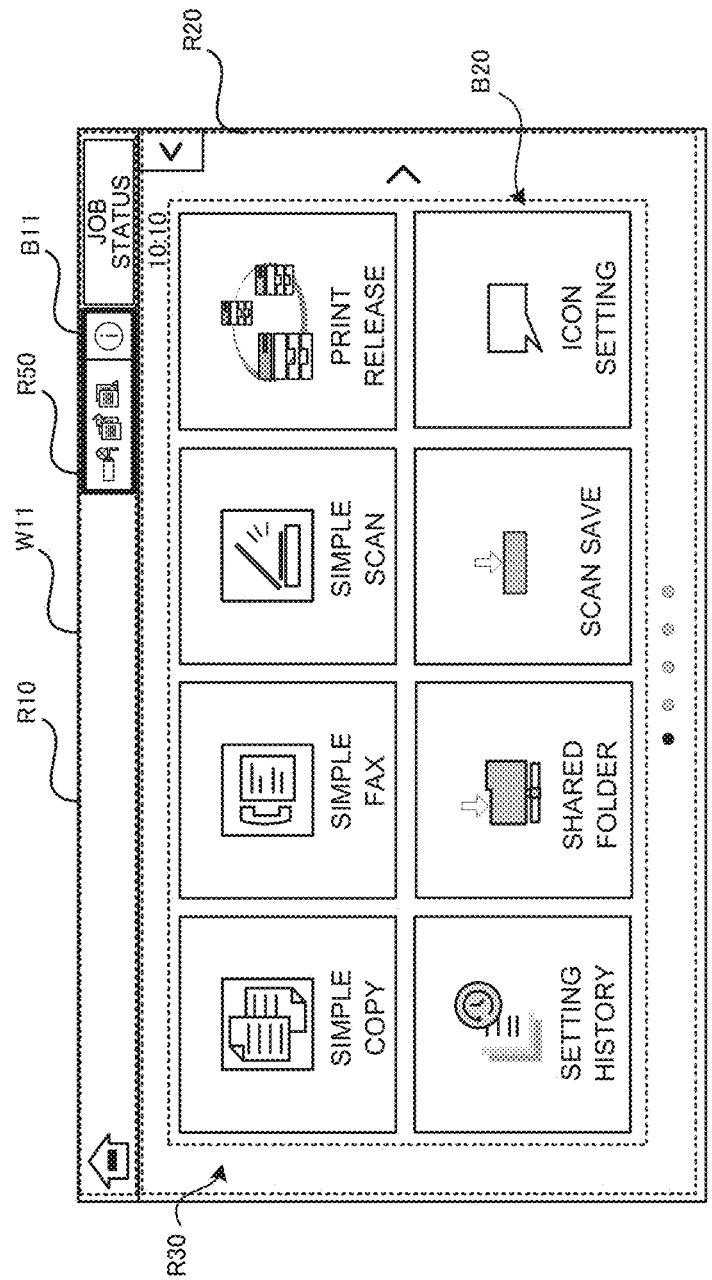
FIG. 9 is a diagram for illustrating an operation example according to the first embodiment.

FIG. 9 illustrates a screen configuration example of a function display screen that is displayed when the display icon setting is "Yes". The screen configuration example of the function display screen W11 is substantially identical to that of the function display screen W10 illustrated in FIG. 6, and thus the same parts are assigned with the same reference numerals.

When the display icon setting is "Yes", as described in FIG. 8 or the like, the fixed area icons are displayed in the fixed area. R10 and the system information button is displayed in a reduced size.

In other words, the function display screen W11 according to FIG. 9 is provided with a fixed area icon display area R50 and a system information button B11 that is displayed in a reduced size, instead of the system information button B10 in the fixed area. R10 of the function display screen W10 in FIG. 6.

The fixed area icon display area R50 is a display area that displays the fixed area icons. The fixed area icon display area R50 can display three icons (icon IDs "0040" "0022", and "0050") based on the settings in the display icon control table. The system information button B11 is one of the display formats when the system information button B10 is displayed in a reduced size, and the function thereof is identical to that of the system information button 110.

As described above, according to the first embodiment, even when the display format in the non-fixed area is not a screen such as the home screen that directly displays information on devices function, and is limited in a displayable area, the icons that are related to the device functions and the system information button that accepts an instruction to display the detailed screen are arranged in the fixed area. Therefore, the optimal information on the device functions can be provided to users.

2 Second Embodiment

A second embodiment of the disclosure is an embodiment in which when the detailed screen is displayed as the display format of the non-fixed area, the display format of icons as function identification information is determined.

2.1. Functional Configuration

The functional configuration of a multifunction copier according to the second embodiment can be identical of that of the multifunction copier 10 according to the first embodiment, and thus the description thereof will be omitted.

2.2. Flow of Processing

Figure 10:
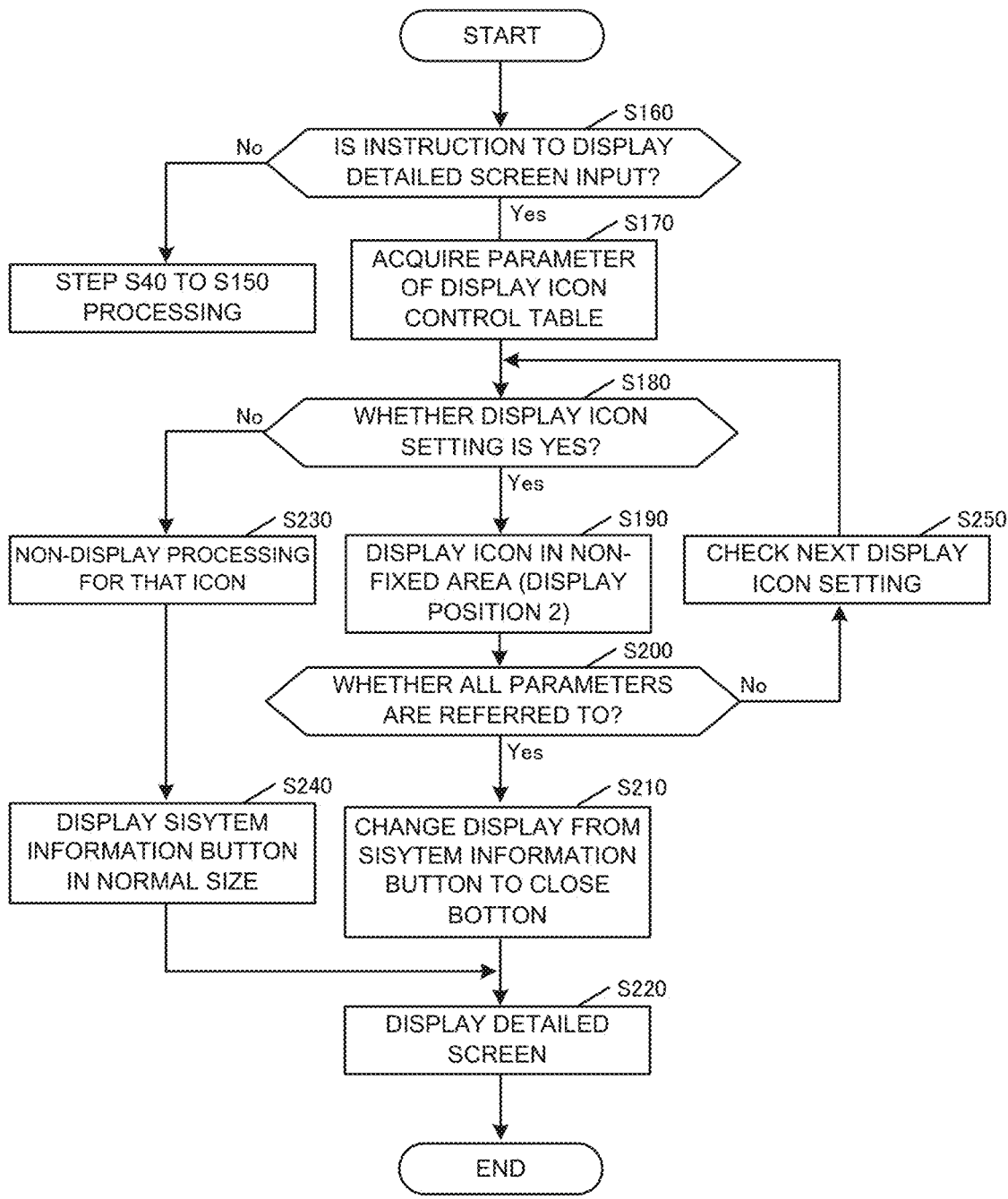
FIG. 10 is a flowchart for illustrating a flow of processing according to a second embodiment of the disclosure.

Next, the flow of processing according to the second embodiment will be described. FIG. 10 is a flowchart for illustrating processing of displaying icons as function identification information. The processing is processing executed by the controller 11 when the controller 11 reads the control program 231, the display control program 232, the display determination program 233, the operation determination program 234, or the like.

First, the controller 11 accepts an input of an instruction to display the detailed screen (step S160). The detailed screen is a screen on which all information on the relevant device functions are referred to. The detailed screen can be displayed by pressing the system information button. B10 of the function display screen W10, the system information button B11 of the function display screen W11, or the like that is illustrated in the first embodiment.

Next, the controller 11 acquires the parameter in the display icon control table (step S170).

The controller 11 determines whether the parameter of the display ion setting is "Yes". In this case, the controller 11 refers to the parameter of the display flag in the display icon control table (step S180).

When determining that the parameter of the display icon setting is "Yes", the controller 11 displays the icon in the non-fixed area (display position 2) (step S180; Yes→step S190).

Next, the controller 11 determines whether all of the acquired parameters are referred to (step S200). When determining that all of the acquired parameters are referred to, the controller 11 changes displaying of the system information button to a close button (step S200; Yes→step S210). Then, the controller 11 displays the detailed screen (step S220) anal ends the processing.

Incidentally, when not accepting an input of the instruction to display the detailed screen (step S160; No), the controller 11 can perform, for example, processing related to step S40 to step S150 of FIG. 5.

Additionally when determining that the display icon setting is "No", the controller 11 performs processing of not displaying the icon (step S180; No→step S230). Then, the controller 11 displays the system information button in a normal size (step S240), displays the detailed screen (step S220), and ends the processing.

Moreover, when determining that all of the acquired parameters are not referred to, the controller 11 checks the next display icon setting and returns the processing to step S180 (step S200; No→step S250).

2.3 Operation Example

Next, an operation example of the second embodiment will be described. FIG. 11 is a drawing that summarizes the display format of icons when the detailed screen is displayed as the display format of the non-fixed area.

When the detailed screen display is "Yes", the fixed area icon set to be displayed in the fixed area. R10 is displayed in the non-fixed area R20, and the non-fixed area icon set to be displayed in the non-fixed area R20 is likewise displayed in the non-fixed area R20. Then, the display of the system information button is changed to the close button.

Figure 5:
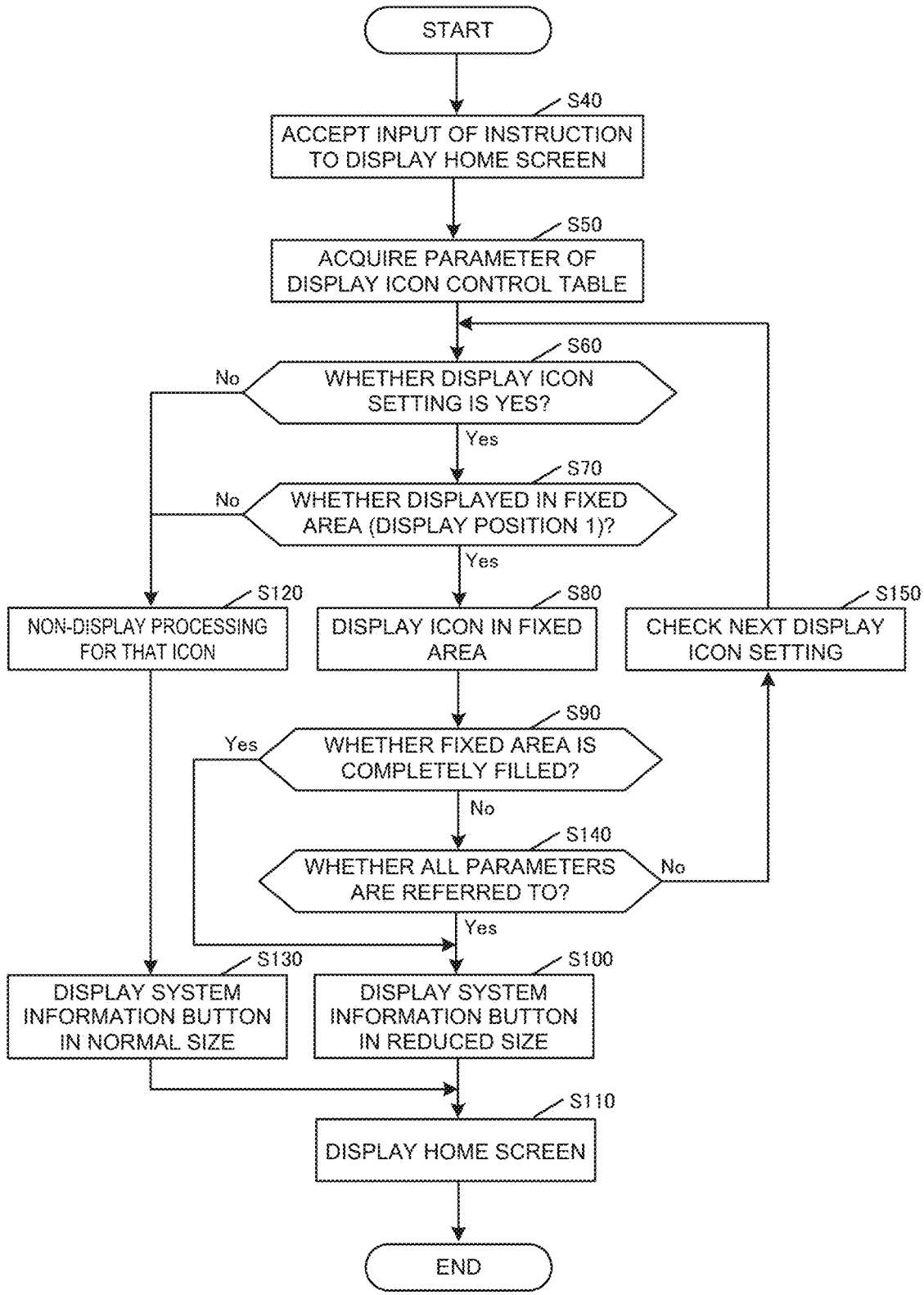
FIG. 5 is a flowchart for illustrating a flow of processing according to the first embodiment.
Figure 6:
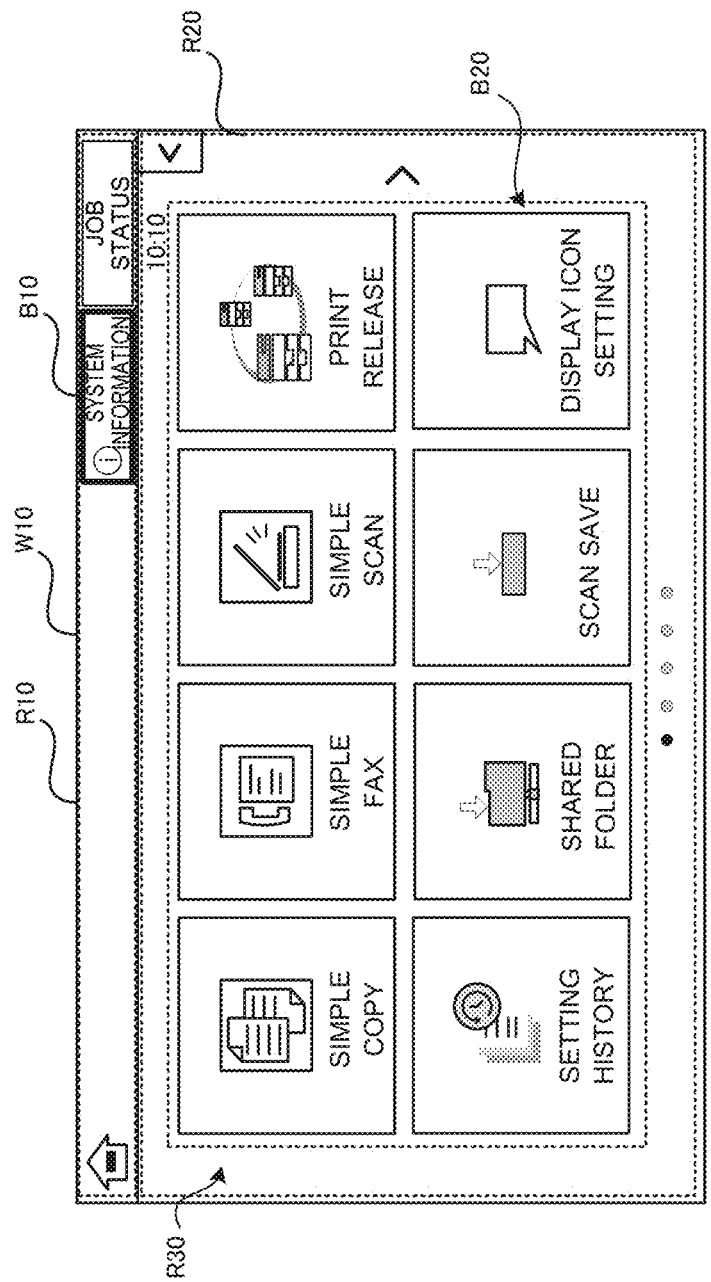
FIG. 6 is a diagram for illustrating an operation example according to the first embodiment.

On the other hand, when the detailed screen display is "No", processing according to steps S40 to S150 in FIG. 5 can be executed. In this case, in the same way as in the first embodiment, the fixed area icon is displayed in the fixed area R10 and the non-fixed area icon is not displayed. Then, the system information button is displayed in a reduced size by displaying the fixed area icon.

Figure 12:
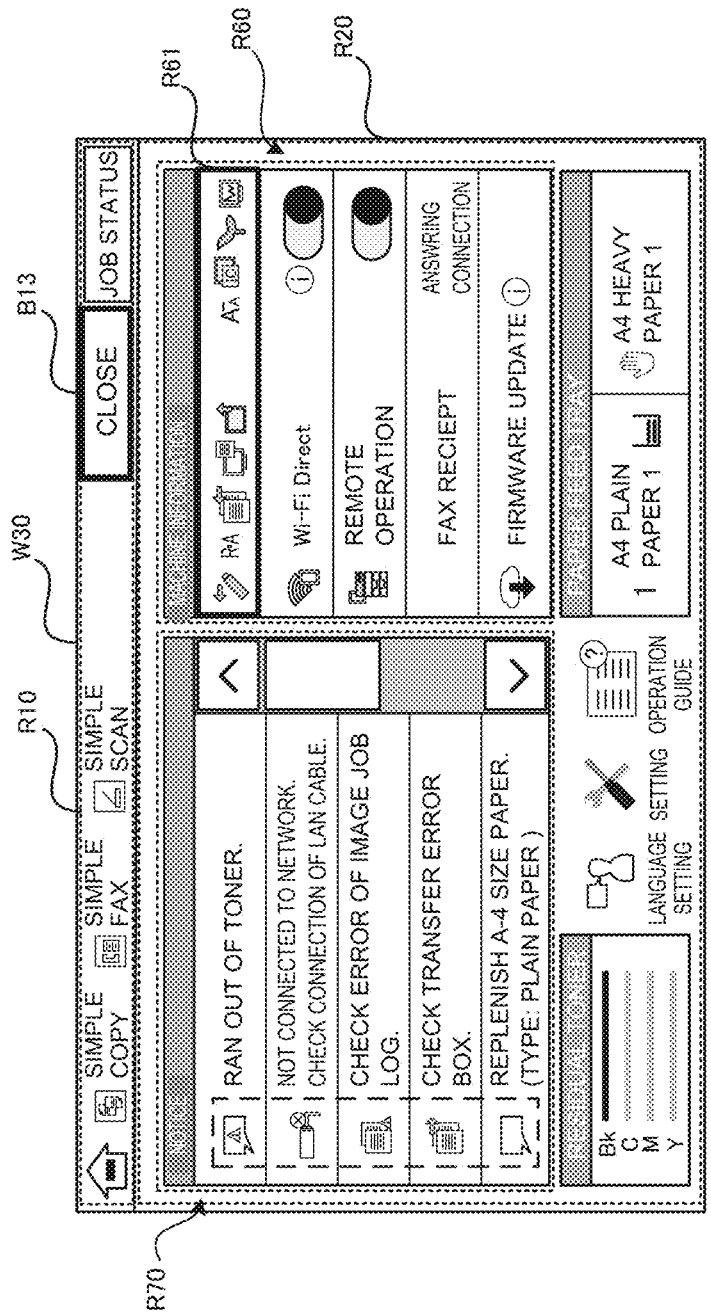
FIG. 12 is a diagram for illustrating an operation example according to the second embodiment.

FIG. 12 illustrates a screen configuration example of a function display screen W30 displayed when the detailed screen display is "Yes". In addition, FIG. 12 illustrates operation examples corresponding to processing according to step S180 (Yes) to step S220 in FIG. 10.

The function display screen W30 includes the fixed area. R10 and the non-fixed area R20 in the same way as the function display screens W10, W11. The fixed area R10 is provided with a close button B13 that accepts an input to end the display of the detailed screen. The close button B13 can prevent overlapped display with the icon displayed in the non-fixed area. 1120 and highlight a button for closing the detailed screen.

The non-fixed area R20 includes a machine information display area R60 and a notice display area R70 that form the detailed screen.

The machine information display area R60 is a display area that displays information on machine situations (for example, communication setting, a communication situation, and the like). Additionally, the machine information display area R60 according to the second embodiment includes a non-fixed area icon display area R61. The non-fixed area icon display area R61 is a display area that displays all of the fixed area icon (with the display flag set to "y") and the non-fixed area icon (with the display flag set to "y") that are set to be displayed in the display icon control table of FIG. 3.

The notice display area R70 is a display area that displays a notice to users. For example, information with a relatively high emergency that image processing cannot be continuously executed, for example, without a prompt action by a user is displayed in the notice display area R70. In addition, when the content of the notice coincides with the content that an icon represents, the icon can also be displayed as indicated in a dashed line frame in the drawing. In this case, in order to avoid overlapped display of the icon, as illustrated in FIG. 12, the icon to be displayed in the notice display area. R70 can be restricted from being displayed in the non-fixed area icon display area. R61.

As described above, according to the second embodiment, when the display format in the non-fixed area is a display format such as the detailed screen that displays information on device functions, the information on device functions can be completely provided to users. Also, the close button to end the display of the detailed screen is provided without arranging the icons in the fixed area, and thus overlapped display of the icon can be prevented and the button for closing the detailed screen can be highlighted.

3 Third Embodiment

A third embodiment of the disclosure is an embodiment in which a multifunction copier is provided with a function to display the detailed screen as a main screen or a sub-screen. Further, in the present disclosure, a screen displayed at the bottom when a plurality of images are displayed in an overlapped manner is referred to as the main screen. Furthermore, in the present disclosure, an image displayed in an overlapped manner with the main screen is referred to as the sub-screen. Typically, in consideration of the frequency of use and operability, an operation screen for copying, faxing, image sending, or the like, a home screen, or the like is assigned to serve as the main screen. In contrast, the sub-screen is often assigned to a detailed screen due to a secondary role as a method for conveying information on device functions. However, a function to display the detailed screen as the main screen is provided for a user who wants to allow the detailed screen to be consistently displayed; therefore, demands of the user can be satisfied. The third embodiment is an embodiment in which when the detailed screen is displayed as the main screen or the sub-screen, representation of an identification tab of the detailed screen or a transition button for transition of screens is controlled.

3.1 Functional Configuration

The functional configuration of a multifunction copier 30 according to the third embodiment can be substantially identical to that of the multifunction copier 10 according to the first embodiment. Therefore, the identical configuration of the multifunction copier 10 is assigned with the same reference numeral and the description thereof will be omitted.

Figure 13:
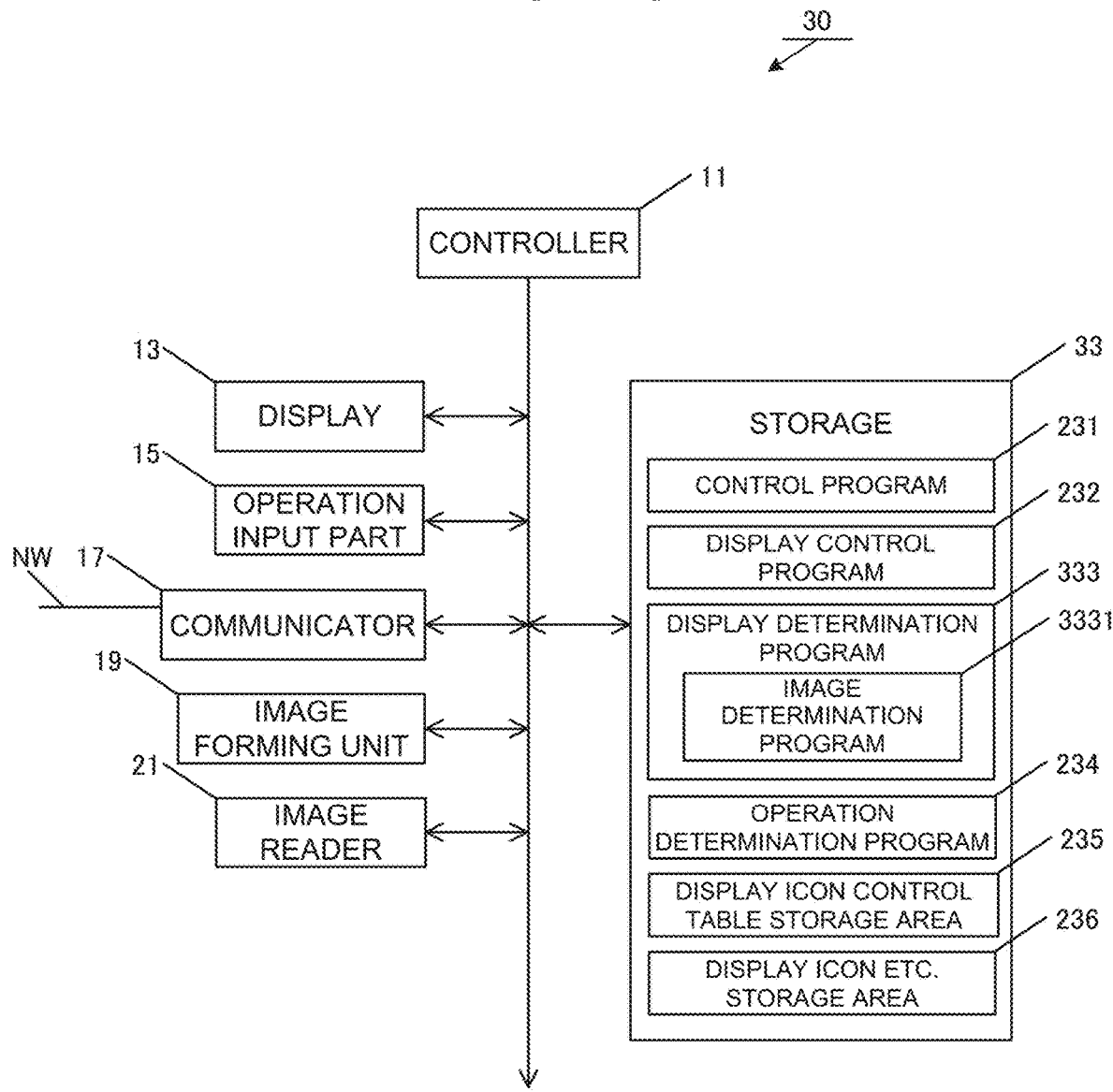
FIG. 13 is a functional configuration diagram of a multifunction copier according to a third embodiment of the disclosure.

FIG. 13 is a functional configuration diagram of the multifunction copier 30 according to the third embodiment. The multifunction copier 30 is provided with a storage 33 instead of the storage 23 of the multifunction copier 10.

The storage 33 stores the control program 231, the display control program 232, a display determination program 333, and the operation determination program 234 and secures the display icon control table storage area 235 and the display icon etc. storage area 236.

The display determination program 333 includes a screen determination program 3331. The screen determination program 3331 is a program read by the controller 11 at the timing of displaying the detailed screen, for example, transitions of screens from the operation screen of copying; faxing, image sending, or the like to the detailed screen or conversely, transition of screens from the detailed screen to the operation screen. The controller 11 that has read the screen determination program 3331 determines whether the detailed screen is displayed on the main screen or is displayed on the sub-screen.

3.2 Flow of Processing

Figure 14:
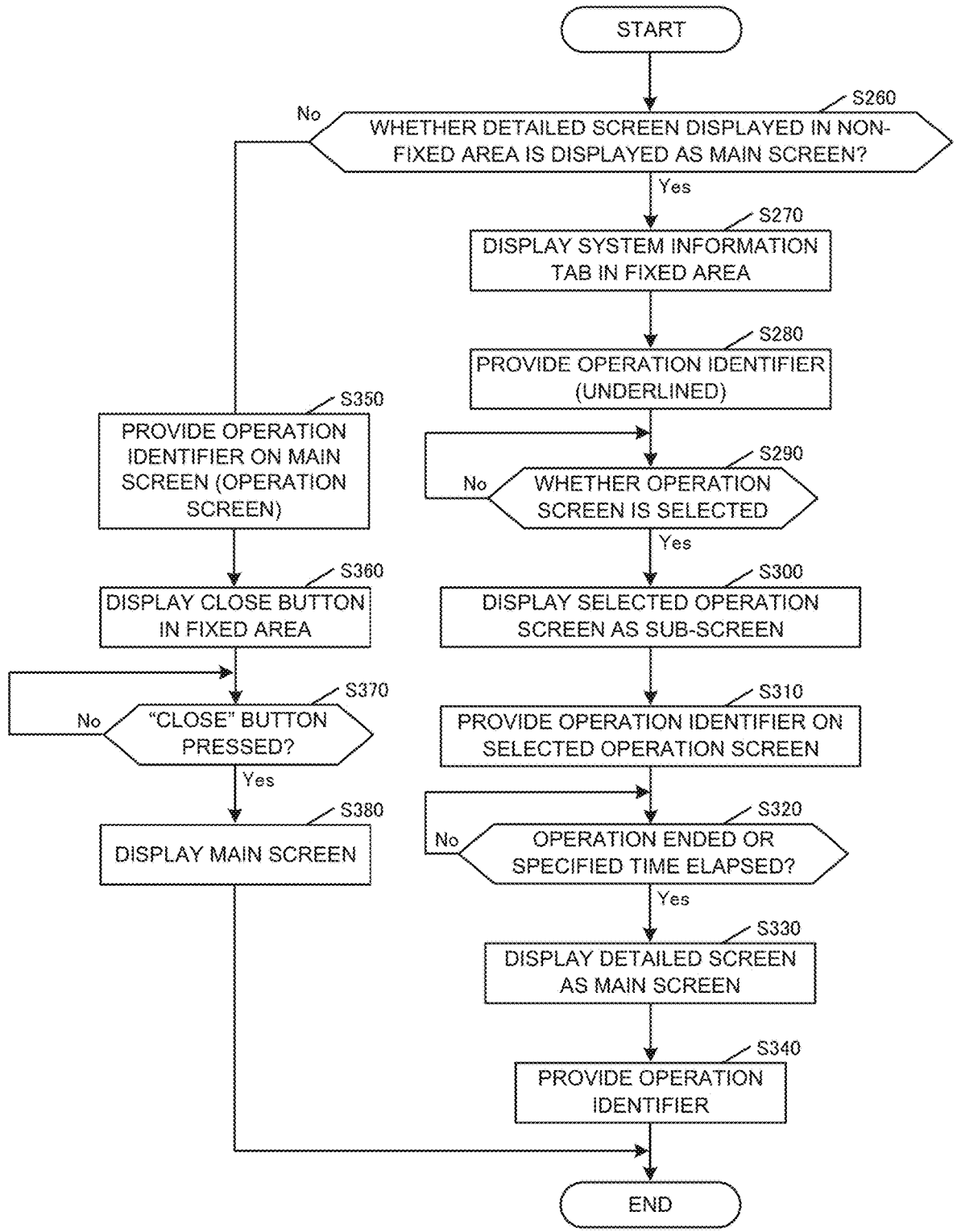
FIG. 14 is a flowchart for illustrating a flow of processing according to the third embodiment.

Next, the flow of processing according to the third embodiment will described. FIG. 14 is a flowchart for illustrating processing of determining the display format of an identification tab of the detailed screen or a transition button related to transition of screens depending on whether the detailed screen is displayed as the main screen.

First, the controller 11 determines, at the timing of displaying the detailed screen, whether the detailed screen displayed in the non-fixed area is displayed as the main screen or is displayed as the sub-screen (step S260).

When determining that the detailed screen displayed in the non-fixed area is displayed as the main screen, the controller 11 displays, in the fixed area, the system information tab as the identification tab of the detailed screen (step S260; Yes step S270).

Next, the controller 11 provides an operation identifier (for example, underline) that indicates the detailed screen is a screen being operated (selected) by a user to the system information tab (step S280).

Then, the controller 11 determines whether the operation screen related to the desired device function is selected by the user (step S290).

When determining that the desired operation screen is selected by the user, the controller 11 displays the operation screen (selected operation screen) as the sub-screen (step S290; Yes→step S300), Additionally, when determining that the operation screen is not selected by the user, the controller 11 continues to display the detailed screen as the main screen (step S290; No).

The controller 11 cancels providing of the operation identifier to the system information tab in accordance with displaying of the selected operation screen and provides the operation identifier to a tab that represents the selected operation screen (step S310).

Then, when an operation via the selected operation screen ends or the operation via the selected operation screen is not performed for the specified time, the controller 11 returns to displaying of the detailed screen as the main screen (step S320; Yes step S330).

The controller 11 cancels providing of the operation identifier to the tab that represents the selected operation screen and provides the operation identifier to the system information tab (step S340), and ends the processing.

Incidentally, when the detailed screen being displayed in the non-fixed area is not displayed as the main screen, the controller 11 provides the operation identifier to a tab that represents the operation screen being displayed on the main screen (step S260; No→step S350).

Next, the controller 11 displays in the fixed area the close button as a display end button that accepts an input to end displaying of the detailed screen (step S360).

When the close button is pressed by the user, the controller 11 ends displaying of the detailed screen as the sub-screen and proceeds with displaying of the operation screen as the main screen (step S370; Yes step S380). Additionally, the controller 11 continues to display the detailed screen as the sub-screen until the close button is pressed (step S370; No).

3.3 Operation Example

Figure 15A:
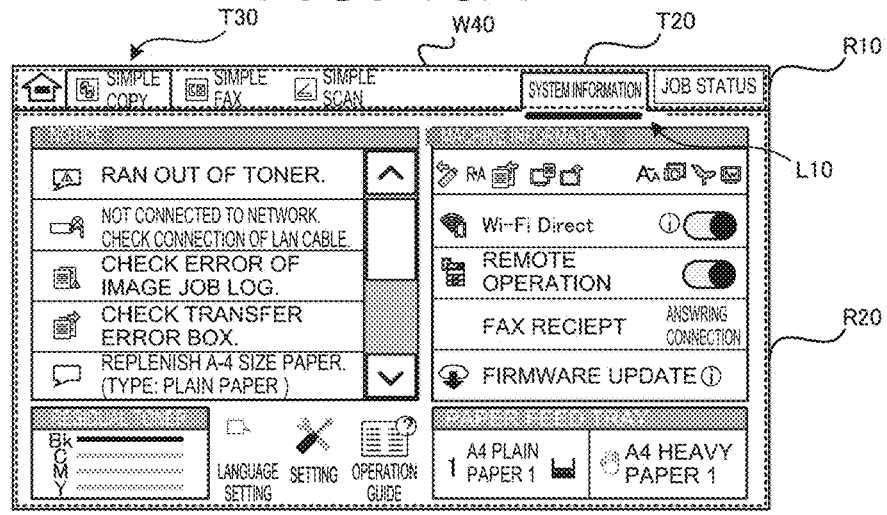
FIGS. 15A-15C are diagrams for illustrating an operation example according to the third embodiment.
Figure 15B:
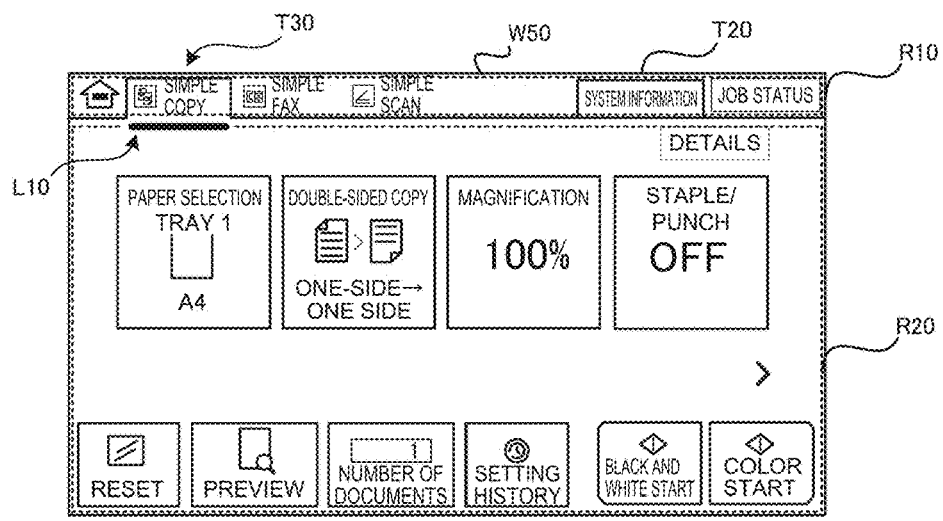
Figure 15C:
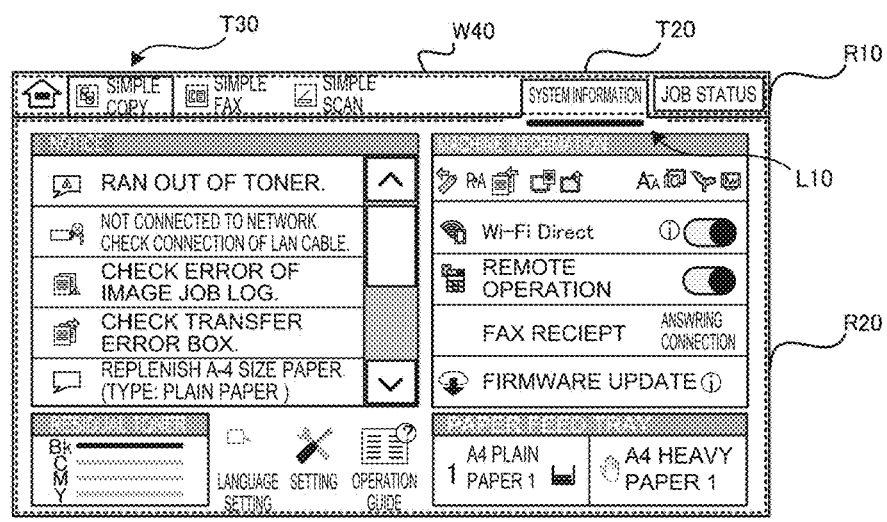
Figure 16A:
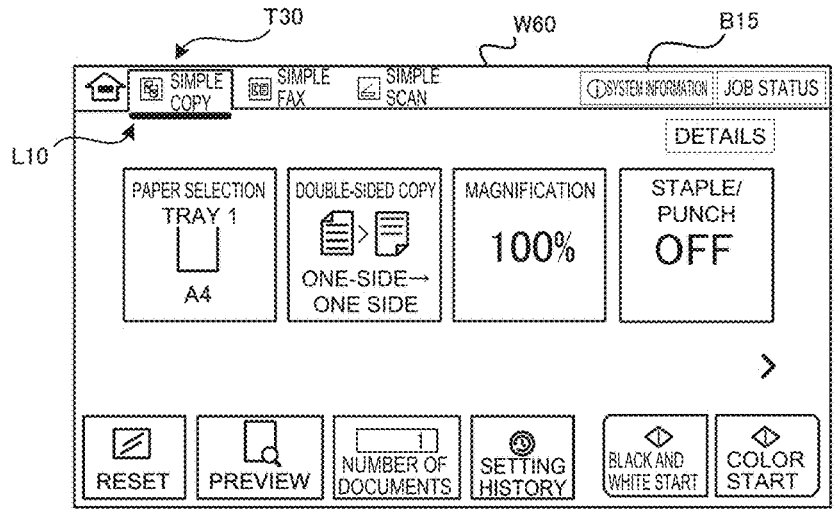
FIGS. 16A-16C are diagrams for illustrating an operation example according to the third embodiment.
Figure 16B:
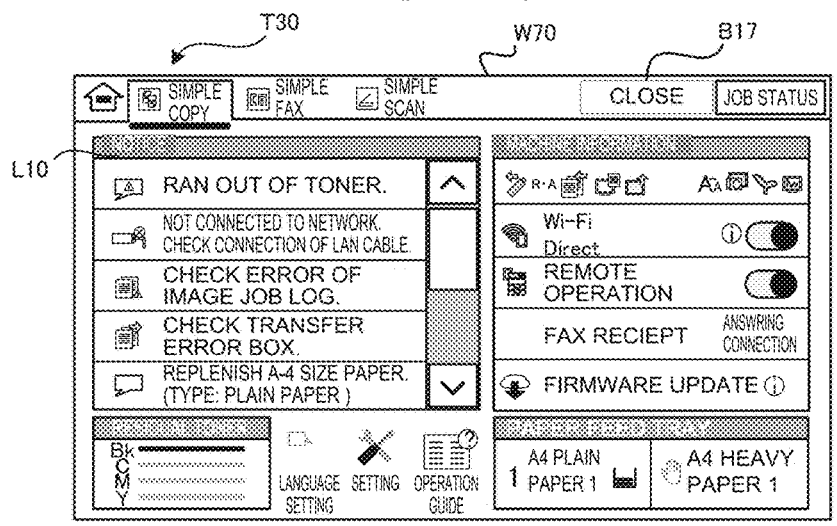
Figure 16C:
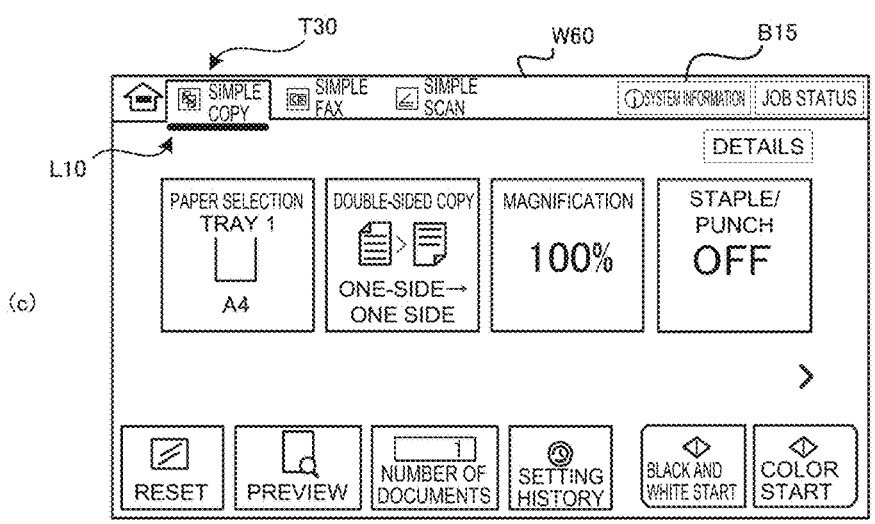

Next, an operation example according to the third embodiment will be described. FIGS. 15A-15C are diagrams for illustrating an operation example when the detailed screen is displayed as the main screen in the non-fixed area R20. Also, FIGS. 16A-16C are diagrams for illustrating an operation example when the detailed screen is displayed as the sub-screen in the non-fixed area R20. Additionally, FIGS. 15A-15C illustrate an operation example corresponding to the processing from steps S260 (Yes) to S340 of FIG. 14, and FIGS. 16A-16C are an operation example corresponding to the processing from steps S260 (No) of FIGS. 14 to S380.

FIG. 15A is a screen configuration example of a function display screen W40 that displays the detailed screen as the main screen. The function display screen W40 can have substantially the same configuration as the function display screen W30 illustrated in FIG. 12 of the second embodiment. The function display screen W40 differs from the function display screen W30 in that a system information tab T20 is displayed in the fixed area R10.

The system information tab T20 functions as an identification information to indicate that the screen to be displayed as the main screen is the detailed screen. In addition, an operation identifier L10 (underline) indicating that the detailed screen is being operated (selected) may be provided on a lower portion of the system information tab T20.

FIG. 15B illustrates a screen configuration example of a function display screen W50 in a case where the user selects a simple copy tab T30 from the state of FIG. 15A and the operation screen related to the simple copy is displayed as the sub-screen. In the example of FIG. 15B, selection tabs related to simple fax and simple scan are not illustrated for ease of explanation.

In accordance with displaying of the operation screen related to simple copy, the operation identifier L10 provided on the lower portion of the system information tab T20 is provided on a lower portion of the simple copy tab T30, and it is represented that the operation screen related to simple copy is being operation (selected).

When, from the state of FIG. 15B, an operation via the operation screen related to the simple copy ends or the specified time has elapsed without the operation, the operation screen related to the simple copy returns to the state of the function display screen W40 illustrated in FIG. 15A (FIG. 15C).

FIG. 16A is one configuration example of a function display screen W60 that displays the operation screen related to the simple copy illustrated in FIGS. 15A-15C is displayed as the main screen. The function display screen W60 can have substantially the same configuration as the function display screen W50. The function display screen W60 differs from the function display screen W50 in that a system information button B15 is displayed in the fixed area R10.

The system information button B15 is an input button that accepts an input of an instruction to display the detailed screen as the sub-screen. Also, the operation identifier L10 (underline) indicating that the operation screen is being operated (selected) is provided on a lower portion of the simple copy tab T30. Additionally, in the example of FIG. 16A, the selection tabs related to simple fax and simple scan are not illustrated for ease of explanation.

FIG. 16B is a screen configuration example of a function display screen W70 in a case where the detailed screen is displayed as the sub-screen when the system information button B15 is pressed by the user from the state of FIG. 16A.

The function display screen W70 differs from the function display screen W40 in that a close button 1317 is displayed in the fixed area R10. The user presses the close button B17 and thus can end displaying of the detailed screen.

In this case, since the operation screen related to simple copy is the main screen, there is no change in displaying of the operation identifier L10 that is provided on the lower portion of the simple copy tab T30 and indicates that, the operation screen related to the simple copy is being operated (selected).

In a case where the close button B17 is pressed from the state of FIG. 1613, the detailed screen as the sub-screen is closed to return to the state of the function display screen W70 illustrated in FIG. 16A (FIG. 16C).

As described above, according to the third embodiment, in a case where the detailed screen is displayed as the main screen or the sub-screen, displaying of the identification tab of the detailed screen or the transition button related to transitions of screens is controlled; therefore, the optimal information on the device functions can be provided to users.

Additionally, the first embodiment and the second embodiment describe that the display setting of the icon is selectable by the user; however, the icon to be displayed can be set based on, for example, (machine) learning results using parameters such as the number of times the icon is referred to and the importance of the displayed content.

The present disclosure is not limited to each of the aforementioned embodiments, and various modifications can be made to the disclosure. In other words, embodiments obtained by combining techniques modified as appropriate without departing from the gift of the present disclosure are also included in the technical scope of the present disclosure.

Further, the aforementioned embodiments are separately described for convenience of explanation but may be obviously combined and implemented within a technically allowable range.

Furthermore, the program that operates on each of the devices in the embodiments is a program that controls a CPU or the like (a program that allows a computer to function) so as to implement the functions of the aforementioned embodiments. In addition, the information handled in the devices is temporarily accumulated in a temporary storage device (for example, RAM) during the processing, and is thereafter stored in various storage devices such as a read only memory (ROM) and HDD and is read, corrected, and written by the CPU as necessary.

Here, a recording medium that stores the program may, be any of a semiconductor medium (for example, a ROM, a non-volatile memory card, or the like), an optical recording medium/magneto optical recording medium (for example, a digital versatile disc (DVI)), a magneto optical disc (MO), a mini disc (MD), a compact disc (CD), a Blu-ray (registered trademark) Disc (BD), or the like), a magnetic recording medium (for example, a magnetic tape, a flexible disk, or the like), and the like. Additionally, the functions of the aforementioned embodiments may be implemented by executing a loaded program. Also, in some cases, the functions of the aforementioned embodiments may be implemented by processing based on instructions of the program in collaboration with an operating system or other application programs.

Moreover, for market distribution, the program can be stored in a portable recording medium to be distributed or can be transferred to a server computer connected via a network such as the Internet. In this case, a storage device of the server computer is obviously included in the present disclosure.

What is claimed is:

1. A display device, comprising:
   a display to display a function display screen based on device functions; and
   a controller that controls the display of the function display screen, wherein:
   the function display screen includes a fixed area where displayed content is fixed and a non-fixed area other than the fixed area,
   the controller determines a display format of the fixed area in accordance with a display format of the non-fixed area,
   when displaying, in the non-fixed area, a detailed screen related to the device functions, the controller displays, in the fixed area, a display end button for accepting an input to end displaying of the detailed screen displayed in the non-fixed area, and
   when not displaying the detailed screen in the non-fixed area, the controller displays, in the fixed area, an icon related to the detailed screen.

2. The display device according to claim 1, wherein the controller displays, in the fixed area, function identification information that identifies the device functions.

3. The display device according to claim 2, wherein when displaying, in the non-fixed area, a setting accepting screen related to the device functions, the controller displays the function identification information in the fixed area.

4. The display device according to claim 1, wherein the controller displays, in addition to the detailed screen, function identification information in the non-fixed area.

5. The display device according to claim 2, wherein the function identification information is information on the device functions selected by a user.

6. The display device according to claim 2, wherein when switching screens to be displayed in the non-fixed area, the controller switches displaying of the function identification information displayed in the fixed area.

7. The display device according to claim 2, wherein the function identification information is graphic information obtained by defining the device functions as a graphic.

8. The display device according to claim 1, wherein when displaying the detailed screen related to the device functions as a main screen in the non-fixed area, the controller displays, in the fixed area, an identification tab that represents the detailed screen.

9. The display device according to claim 8, wherein the controller displays, in the identification tab, an operation identifier that identifies an operation screen related to a device function selected by a user.

10. The display device according to claim 8, wherein when displaying, in the non-fixed area, the detailed screen as a sub-screen, the controller displays, in the fixed area, the display end button that accepts an input to end displaying of the detailed screen.

11. An image processing device comprising:
the display device according to claim 1; and
an image processor that processes an image as a device function.

12. The display device according to claim 2, wherein the controller determines a display format of the function identification information displayed in the fixed area in accordance with the display format of the non-fixed area.

13. The display device according to claim 1, wherein the displayed content in the fixed area is fixed in accordance with a display setting to the fixed area set in the non-fixed area.

14. A display method, comprising:
displaying a function display screen based on device functions; and
determining a display of the function display screen, wherein:
the function display screen includes a fixed area where displayed content is fixed and a non-fixed area other than the fixed area, and
a display format of the fixed area is determined in accordance with a display format of the non-fixed area,
when displaying, in the non-fixed area, a detailed screen related to the device functions, a display end button is displayed in the fixed area, the display end button for accepting an input to end displaying of the detailed screen displayed in the non-fixed area, and
when not displaying the detailed screen in the non-fixed area, an icon related to the detailed screen is displayed in the fixed area.

* * * * *